United States Patent
Nakao et al.

(10) Patent No.: US 6,317,237 B1
(45) Date of Patent: Nov. 13, 2001

(54) VOICE MONITORING SYSTEM USING LASER BEAM

(75) Inventors: Masashi Nakao; Masahiko Hara, both of Tokyo (JP)

(73) Assignee: Kyoyu Corporation, Tokyo (JP)

( * ) Notice: Subject to any disclaimer, the term of this patent is extended or adjusted under 35 U.S.C. 154(b) by 0 days.

(21) Appl. No.: 09/269,320

(22) PCT Filed: Jul. 31, 1997

(86) PCT No.: PCT/JP97/02694

§ 371 Date: Mar. 24, 1999

§ 102(e) Date: Mar. 24, 1999

(87) PCT Pub. No.: WO99/06804

PCT Pub. Date: Feb. 11, 1999

(51) Int. Cl.[7] .................................................. H04B 10/00
(52) U.S. Cl. ........................... 359/159; 359/170; 359/172
(58) Field of Search ................................. 359/154, 169, 359/170, 168, 172, 159; 250/208.2; 342/53, 54

(56) References Cited

U.S. PATENT DOCUMENTS

| | | | |
|---|---|---|---|
| 3,875,400 | * | 4/1975 | Pao et al. ............................... 359/181 |
| 4,361,911 | * | 11/1982 | Buser et al. ........................... 455/605 |
| 4,731,879 | * | 3/1988 | Sepp et al. ............................ 455/604 |
| 4,768,381 | | 9/1988 | Sugimoto ............................... 73/657 |
| 4,829,729 | * | 5/1989 | Derner et al. ............................ 52/171 |
| 4,932,775 | * | 6/1990 | Wissman et al. ......................... 356/5 |
| 5,192,979 | * | 3/1993 | Grage et al. ........................... 356/28.5 |
| 5,220,328 | * | 6/1993 | Jehle et al. ............................. 342/21 |
| 5,303,020 | * | 4/1994 | Croteau ................................. 356/5 |
| 5,347,386 | * | 9/1994 | Gibbs et al. .......................... 359/146 |
| 5,764,395 | * | 6/1998 | Iwata .................................... 359/172 |
| 5,872,646 | * | 2/1999 | Alderman et al. ................... 359/169 |
| 6,114,684 | * | 9/2000 | McGuire ............................ 250/208.2 |

FOREIGN PATENT DOCUMENTS

| | | |
|---|---|---|
| 5425822 | 8/1979 | (JP) . |
| 6388409 | 4/1988 | (JP) . |
| 3242518 | 10/1991 | (JP) . |

* cited by examiner

*Primary Examiner*—Leslie Pascal
(74) *Attorney, Agent, or Firm*—Ladas & Parry (57) ABSTRACT

An infrared laser beam (B1) is irradiated from a transmitter (100) toward a window pane (410) of a building (400), and a reflected laser beam (B2) is received by a receiver (200). A laser spot (Q) picked up by a CCD camera is displayed on respective target display units (113, 213). Within the receiver, there are provided a photo-cell for outputting an electric signal corresponding to light energy of the reflected beam, and a knife edge for shielding a portion of the reflected beam. Vibrational component of the window pane caused by voice in the room is detected as a positional change of the reflected beam. In determining an installation place of the receiver, a beam detector (300) comprised of a large number of light receiving elements is used to detect the reflected beam. The transmitter scans an object with the laser beam (B1) modulated by an audible frequency so that the reflected beam (B2) is easily detected. When the reflected beam hits the beam detector, the detector beeps vibratorily with the audible frequency. The XY coordinates showing an actual scanning position are transmitted from the transmitter to the receiver, and shown on a coordinate display unit (212).

16 Claims, 8 Drawing Sheets

VOICE MONITORING SYSTEM USING LASER BEAM

TECHNICAL FIELD

This invention relates to a voice monitoring system using laser beam and, more particularly, to a system for irradiating a laser beam of non-visible wavelength band onto a window pane of a room, etc. to monitor voice within the room on the basis of positional change of a reflected beam.

BACKGROUND ART

Since it has been passed about forty years from finding or discovery of laser, the laser technology is utilized in wide variety of technical fields. Particularly, in the technical field for measuring physical action, very high accuracy measurement can be made by making use of high coherent characteristic of a laser beam. For example, in the field where very small mechanical vibration is measured, a laser beam is irradiated onto an object to be measured and a reflected light is monitored, whereby high accuracy analysis of very small vibration is carried out.

On the other hand, for the purpose to monitor voice, a system having a microphone is still utilized from the past several ten years up to the present. However, in such a conventional system having a microphone, there is a problem that it is difficult to monitor voice from remote place. For this reason, in order to monitor voice in a room from the outside of the room, it is necessary to install a microphone within the room or in the vicinity of the room. However, in special or particular circumstances such as criminal investigation, etc., there are many instances where it is difficult to install a microphone within the room to be monitored or in the vicinity thereof, and there is no margin in point of time. In such a case, hitherto, it was inevitably required to employ a remote monitoring method in which a microphone having uni-directivity is installed at a remote place from the room and voice wave propagated through the space is collected by the microphone.

In view of the above, an object of this invention is to provide a voice monitoring system using laser beam which can monitor voice within a room from a remote place.

DISCLOSURE OF INVENTION (1) A first feature of this invention resides in a voice monitoring system using laser beam for monitoring voice within a room from an outside of the room, the system comprising:
  a laser transmitter for irradiating a laser beam of invisible wavelength band toward a predetermined target to be monitored; and
  a laser receiver for converting a positional change of a reflected beam from the target into an electric signal and extracting a voice band component from the electric signal to output it.

(2) A second feature of this invention resides in a voice monitoring system using laser beam according to the first feature,
  wherein a beam scanning mechanism for scanning with a laser beam is provided in the laser transmitter so that a laser spot formed on the target by irradiation of the laser beam can be moved within a plane of the target.

(3) A third feature of this invention resides in a voice monitoring system using laser beam according to the second feature,
  wherein the laser transmitter includes a coordinate display unit for displaying coordinates indicating a scanning position at a current time of the laser beam and a communication device for transmitting a signal indicative of the coordinates to the laser receiver; and
  wherein the laser receiver includes a communication device for receiving the signal indicative of the coordinates transmitted from the laser transmitter and a coordinate display unit for displaying the coordinates.

(4) A fourth feature of this invention resides in a voice monitoring system using laser beam according to the second feature, wherein there is further provided a beam detector including:
  a light receiving plate in which a plurality of light receiving elements are arranged, each of the light receiving elements producing an electric signal when it receives a reflected beam from the target; and
  a signaling unit for informing of existence of the reflected beam on the basis of the electric signal.

(5) A fifth feature of this invention resides in a voice monitoring system using laser beam according to the fourth feature,
  wherein the laser transmitter has a function to operate in two modes of a continuous mode for irradiating a laser beam as a continuous signal and a modulation mode for irradiating a laser beam as a modulated signal having a predetermined audible frequency; and
  wherein the signaling unit in the beam detector is constituted by a unit having a function to present sound of the audible frequency by using the modulated signal when a reflected beam produced in the modulated mode is received.

(6) A sixth feature of this invention resides in a voice monitoring system using laser beam according to the second feature, wherein there is further provided a beam detector including:
  a light receiving plate in which a plurality of light receiving elements are arranged, each of the light receiving elements producing an electric signal when it receives a reflected beam from the target; and
  a communication device for transmitting, to the laser transmitter, a scanning control signal for controlling the beam scanning mechanism on the basis of the electric signal.

(7) A seventh feature of this invention resides in a voice monitoring system using laser beam according to the first feature, wherein the laser transmitter includes:
  a CCD camera having a sensitivity for a wavelength of the laser beam, an optical axis of the CCD camera being adjusted so that images of the target and a laser spot formed on the target can be taken; and
  a target display unit for displaying the images taken by the CCD camera.

(8) A eighth feature of this invention resides in a voice monitoring system using laser beam according to the first feature, wherein the laser receiver includes:
  a CCD camera having a sensitivity for a wavelength of the laser beam;
  a target display unit for displaying an image taken by the CCD camera;
  a positional change detecting unit for converting a positional change of the reflected beam from the target into an electric signal;
  a sound circuit for extracting a voice band component from the electric signal;
  an optical device for selectively forming a first path for guiding the reflected beam from the target to the CCD camera and a second path for guiding the reflected beam to the positional change detecting unit; and an installation state adjustment device for adjusting an installation state of the laser receiver.

(9) A ninth feature of this invention resides in a voice monitoring system using laser beam according to the first feature, wherein the laser receiver includes:

a knife edge provided along an optical path of the reflected beam from the target for shielding a portion of the reflected beam;

a shielding position adjustment device for adjusting a shielding position of the knife edge; and a light receiving element to receive light flux of the reflected beam which has not been shielded by the knife edge and to output an electric signal corresponding to energy of received light flux;

thus to convert a positional change of the reflected beam into an electric signal.

(10) A tenth feature of this invention resides in a voice monitoring system using laser beam according to the ninth feature, wherein the laser receiver further includes:

a light receiving sensitivity display unit for displaying a value of an electric signal that the light receiving element outputs; and an installation state adjustment device for adjusting an installation state of the laser receiver.

BEST MODE FOR CARRYING OUT THE INVENTION

This invention will now be described in accordance with preferred embodiment shown.

§1 Fundamental Principle

Figure 1:
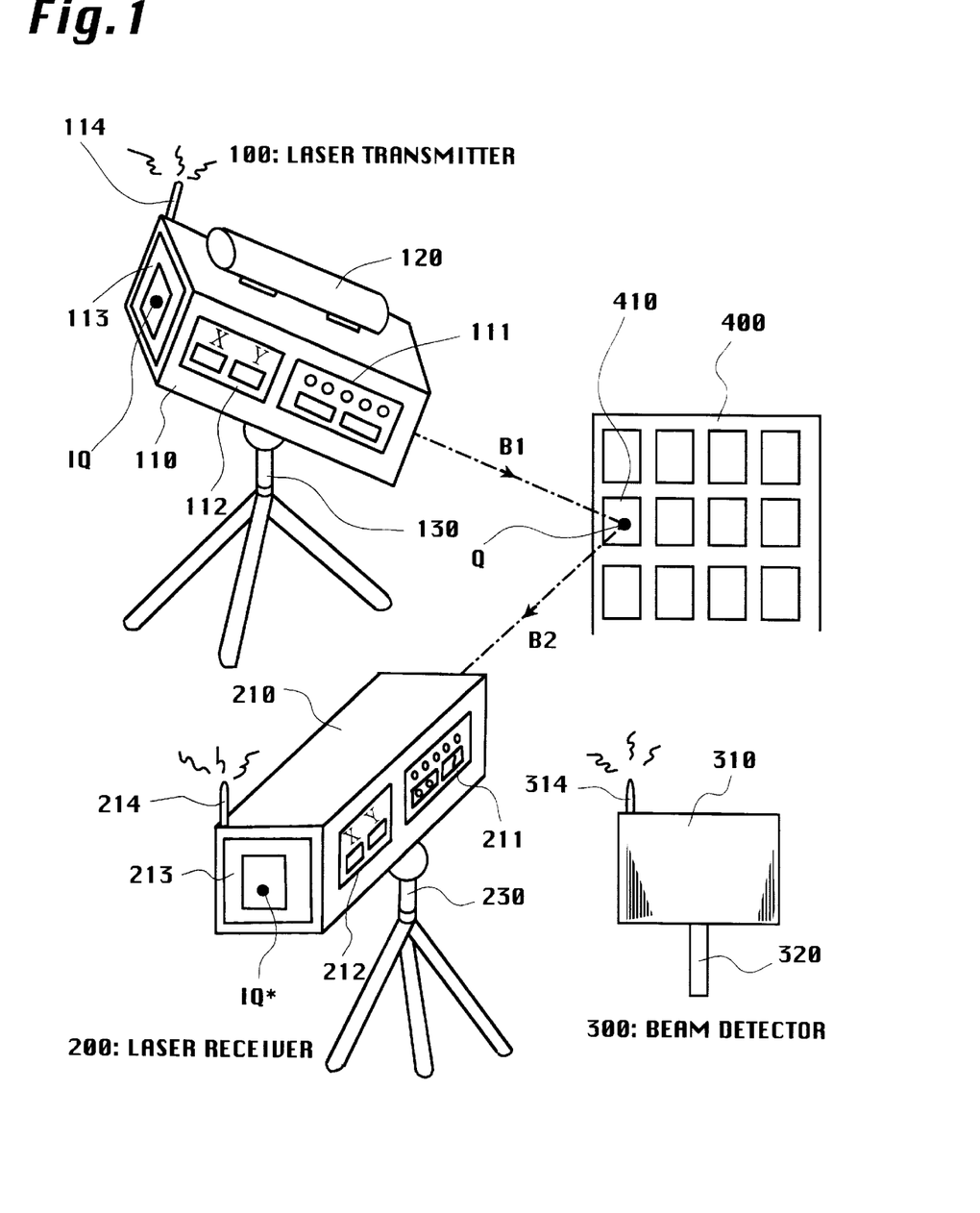
FIG. 1 is a perspective view showing a configuration of the entirety of a voice monitoring system according to an embodiment of this invention.

A configuration of the entirety of a voice monitoring system according to an embodiment of this invention is shown in FIG. 1. The main components of this system are a laser transmitter 100, a laser receiver 200 and a beam detector 300. In this chapter, an outline of this system will now be described by taking, as an example, the case where a content of conversation carried out within a room of a building 400 is monitored in the circumstances where it is not noticed by persons concerned of conversation.

The laser transmitter 100 has a function to irradiate a laser beam B1 of non-visible wavelength band. It is composed of three units of a main casing unit 110, a scope unit 120 and a stand unit 130. As described later, main components of this laser transmitter 100 are accommodated within the main casing unit 110, and a CCD camera 121 is accommodated within the scope unit 120 fixed on the upper surface of this main casing unit 110. As shown, a console panel 111 and a coordinate display unit 112 are provided on a side surface of the main casing unit 110, and a target display section 113 is provided on a back face thereof. Moreover, an antenna 114 for carrying out transmission/reception of signal by radio wave is attached on an upper surface of the main casing unit 110. The stand portion 130 has a function to support the entirety of the main casing unit 110 and to adjust its installation state. Namely, the stand unit 130 has a mechanism for adjusting height, direction and angle, etc. of the main casing unit 110 and serves to adjust installation state of the main casing unit 110, thereby making it possible to irradiate laser beam B1 emitted therefrom in an arbitrary direction.

On the other hand, the laser receiver 200 is composed of two units of a main casing unit 210 and a stand unit 230. It has a function to receive a reflected beam B2 produced by the laser beam B1, to convert its positional change into an electric signal and to extract a voice band component of this electric signal to output it. As described later in detail, main components of this laser receiver 200 are accommodated within the main casing unit 210. Moreover, as shown, a console panel 211 and a coordinate display unit 212 are provided on a side surface of the main casing unit 210, and a target display unit 213 is provided an a back face thereof. Further, an antenna 214 for carrying out transmission/ reception of signal by radio wave is attached on an upper surface of the main casing unit 210. A stand unit 230 has a function to support the entirety of the main casing unit 210 and to adjust installation state. Namely, the stand unit 230 has a mechanism for adjusting height, direction and angle, etc. of the main casing unit 210 similarly to the stand portion 130, and serves to adjust the installation state of the main casing unit 210, thereby making it possible to adjust relative position and/or direction of an incident reflected beam B2.

When viewed from the principle, it is essentially sufficient to prepare the laser transmitter 100 and the laser receiver 200 to monitor the content of conversation carried out within a room of the building 400. For example, the laser beam B1 is irradiated from the laser transmitter 100 so that a window pane of a room of the building 400 is caused to be as a target 410 and a laser spot Q is formed on the target 410. When a specular reflection surface such as a window pane is selected as a target, a portion of the irradiated laser beam B1 is specularly reflected so that a reflected beam B2 is produced. Then, the reflected beam B2 is received by the laser receiver 200. At this time, if the target 410 is maintained in a stationary state, an optical path of the reflected beam B2 is kept stationary at all times. However, in practice, the target 410 is vibrated by various factors. Particularly, in the case where conversation is carried out within the room, vibration based on voice of the conversation is transmitted up to the window pane. In this case, voice component of the conversation is included in vibration of the target 410. Such vibration of the target 410 would change the optical path of the reflected beam B2. Since the laser receiver 200 has a function to extract, as an electric signal, voice band component of positional change of the reflected beam B2, it becomes possible to monitor voice of the conversation as an electric signal.

The fundamental principle of the voice monitoring system according to this invention has been described above. However, in practice, it is extremely difficult to utilize the system for carrying out only operation based on this fundamental principle. Because it is impossible to confirm a position of the reflected beam B2 by the naked eyes, since a laser beam of non-visible wavelength band is used. In the case of monitoring voice within a room from an external of the room for the purpose of criminal investigation, etc., it is required that nobody in the room should notice the fact that the conversation is being monitored. For this reason, it is necessary to use a laser beam having a wavelength of non-visible region. Moreover, even in the case where permission to monitor conversation is obtained from the persons in the room and they notice the fact that the conversation is being monitored, it is still preferable to use a laser beam of non-visible wavelength band. As it is expected that irradiation of laser beam is carried out from one side toward the other side of a general public road or a private land, when a laser beam of visible wavelength band is used, various obstructions may take place. Therefore, to use a laser beam of non-visible region is one of characterized features of the voice monitoring system according to this invention. This is a remarkable point different from the conventional measurement systems using visible laser beam which are utilized in general vibration detection.

As stated above, since a position of reflected beam B2 cannot be confirmed by the naked eyes in the system using laser beam of non-visible wavelength band, preparatory work for installing the laser receiver 200 at a correct position becomes very difficult. In view of this, in this invention, the beam detector 300 is further used in addition to the laser transmitter 100 and the laser receiver 200 to thereby improve operability in practice, as shown in FIG. 1. The beam detector 300 comprises a light receiving plate 310 in flat plate form and a grip 320 for supporting the light receiving plate 310. Moreover, the beam detector 300 also comprises an antenna 314 for carrying out transmission/reception of signal by radio wave. The light receiving plate 310 comprises a large number of light receiving elements arranged on a plane, wherein individual light receiving elements have a function to produce an electric signal when a reflected beam B2 is received from the target 410. An operator could find the reflected beam B2 by trial and error with the following way. That is, he/she holds the grip 320 by one hand to take the light receiving plate 310 at an upright position so that it is located at a position expected to be on an optical path of the reflected beam B2. When the reflected beam B2 hits the light receiving plate 310, the operator can recognize this on the basis of an electric signal produced by the light receiving elements.

In the voice monitoring system according to this invention, various more practical devices for detecting a reflected beam B2 are implemented in a manner including utilization of this beam detector 300. These devices above will now be described in order.

§2 Configuration of the Laser Transmitter 100

Figure 2:
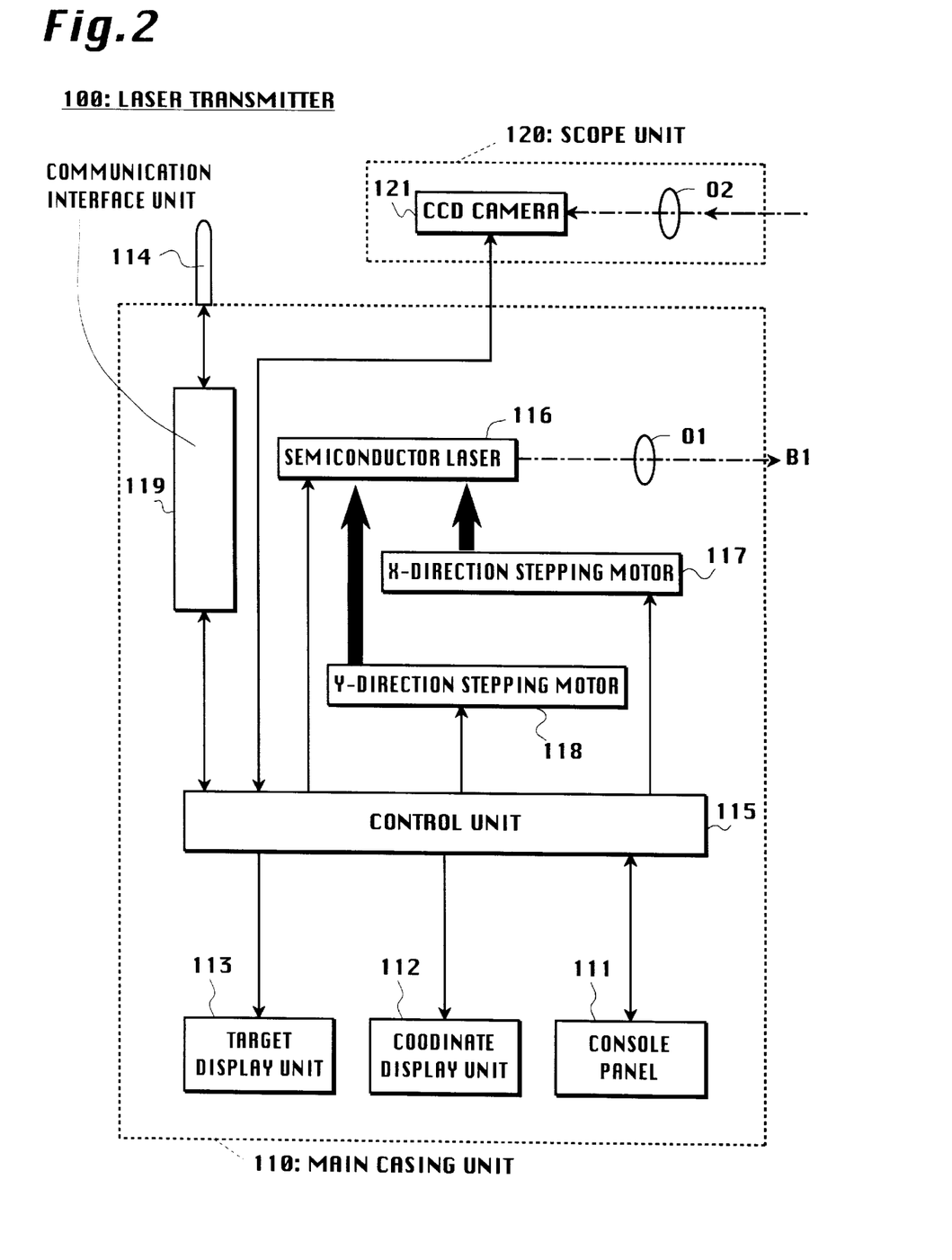
FIG. 2 is a block diagram showing an internal configuration of the laser transmitter 100 shown in FIG. 1.

The block diagram showing the internal configuration of the laser transmitter 100 shown in FIG. 1 is shown in FIG. 2. As previously described, the laser transmitter 100 is composed of the main casing unit 110, the scope unit 120 and the stand unit 130 (not shown in FIG. 2). Broken lines in this block diagram indicate partitions between the main casing unit 110 and the scope unit 120. In addition, thin arrows indicate paths of electric signals, thick arrows indicate paths of mechanical action, and arrows indicated by single dotted lines indicate an optical path.

A control unit 115 is a unit including a CPU therewithin, and has a function to control the entirety of this laser transmitter 100. A semiconductor laser 116 is a unit for producing a laser beam of non-visible wavelength band on the basis of instruction from the control unit 115, and a laser beam thus produced is irradiated as a laser beam B1 toward the external through an optical system 01. In this embodiment, a unit for producing a near-infrared beam having a wavelength of 830 nm as a laser beam of non-visible wavelength band is used. Of course, a laser beam of any wavelength may be used as far as a laser beam of non-visible wavelength band is employed. It is preferable, in practice, to use a laser beam of wavelength in near-infrared or infrared region because attenuation by air is small in this region. In this embodiment, the control unit 115 has a function to operate the semiconductor laser 116 in two kinds of modes. The first operation mode is a continuous mode to irradiate a laser beam B1 as a continuous signal and the second operation mode is a modulation mode to irradiate a laser beam B1 as a modulated signal having a predetermined audible frequency. In order to operate the semiconductor laser 116 in the continuous mode, it is sufficient to deliver a continuous operation signal from the control unit 115 to the semiconductor laser 116. In order to operate it in the modulation mode, it is sufficient to deliver an intermittent pulse shaped operation signal. It is to be noted that the reason why such two kinds of operation modes are prepared will be described later.

The great feature of this laser transmitter 100 is that it comprises a beam scanning mechanism for scanning with a laser beam B1 irradiated from the semiconductor laser 116. Namely, within the main casing 110, there are prepared an X-direction stepping motor 117 for deflecting the semiconductor laser 116 in a horizontal direction (called in the X-axis direction here) and a Y-direction stepping motor 118 for deflecting the semiconductor laser 116 in a vertical direction (called in the Y-axis direction here). These motors control a direction of the semiconductor laser 116 on the basis of instruction from the control unit 115. As a result, laser spot Q on the target 410 can be moved in upper and lower directions and in left and right directions within the plane of the target 410. It is to be noted that while, in the example shown, the direction of the semiconductor laser 116 is controlled by the motor so that scanning with the laser beam B1 is carried out, the optical system O1 may be driven by the motor to carry out beam scanning.

A console panel 111, a coordinate display unit 112 and a target display unit 113 shown at the bottom portion of FIG. 2 are components provided on the side surface or the back face of the main casing unit 110 as shown in FIG. 1. The console panel 111 is composed of operation buttons for allowing the operator to give various instructions to the control unit 115, and indicators for allowing the control unit 115 to inform operational situations to the operator in a manner opposite to the above, etc. Coordinates of a scanning position of the laser beam B1 at the current time is displayed on the coordinate display unit 112. In this beam scanning mechanism, an X-coordinate and a Y-coordinate are respectively defined in the horizontal direction and in the vertical direction. Scanning positions of the laser beam B1 at respective time points are specified by X-coordinate values and Y-coordinate values. The coordinate display unit 112 shown in FIG. 1 is constituted by a liquid crystal display for displaying a X-coordinate value and a Y-coordinate value. Thus a scanning position of the laser beam B1 can be confirmed on the real time basis as numeric values.

The control unit 115 delivers pulse signals for carrying out beam scanning to the X-direction stepping motor 117 and the Y-direction stepping motor 118 and delivers, to the coordinate display unit 112, an X-coordinate value and a Y-coordinate value which are determined in accordance with count values of the pulse signals. Moreover, the control unit 115 also delivers an X-coordinate value and a Y-coordinate value to a communication interface unit 119 to transmit them as radio wave through the antenna 114 to the external. As described later, the X-coordinate value and the Y-coordinate value which have been transmitted are received by the laser receiver 200. In this example, the antenna 114 and the communication interface unit 119 also have a function to receive signal transmitted from the beam detector 300, but this receiving function will be described later.

On the other hand, a CCD camera 121 and an optical system O2 are included within the scope unit 120. The optical system O2 has a function to form an image of the target 410 on a surface of the CCD camera 121. An image of the laser spot Q may be included in the image of the target 410. The optical axes of the CCD camera 121 and the optical system O2 are adjusted so that they are located at suitable positions for forming an image. In this embodiment, a typical CCD camera for monochromatic image is used, and this CCD camera has a sensitivity also in the near infrared wavelength band of the laser beam. Accordingly, when the laser beam B1 is irradiated from the laser transmitter 100 toward the target 410 as shown in FIG. 1, a picture image of the laser spot Q is taken by the CCD camera 121 along with a picture image of the target 410. A picture signal outputted from the CCD camera 121 is delivered to the target display unit 113 through the control unit 115. It is a matter of course that the picture signal of the CCD camera 121 may be delivered directly to the target display unit 113 without intervening the control unit 115.

The target display unit 113 is a unit having a function to display a picture image taken by the CCD camera 121. In this embodiment, a typical CRT display is used as the target display unit 113. As shown in FIG. 1, the target display unit 113 is provided on the back face of the main casing unit 110. The operator can confirm an actual position of the laser spot Q (i.e., an irradiation position of the laser beam B1) formed on the target 410 by checking a picture on the target display unit 113. A doted image IQ shown on the target display unit 113 of FIG. 1 indicates an image of the laser spot Q.

§3 Configuration of the Laser Receiver 200

Figure 3:
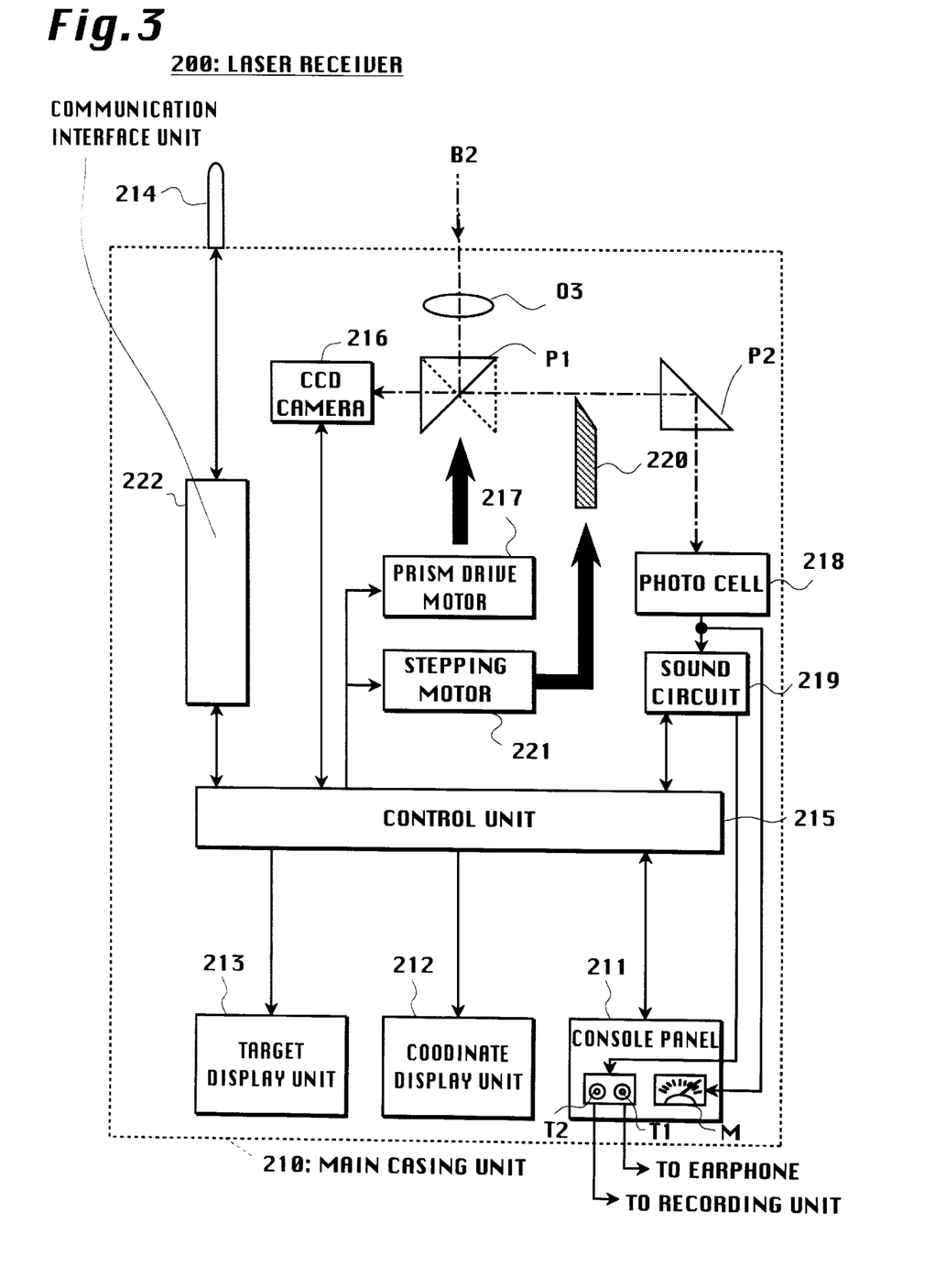
FIG. 3 is a block diagram showing an internal configuration of the laser receiver 200 shown in FIG. 1.

FIG. 3 is a block diagram showing an internal configuration of the laser receiver 200 shown in FIG. 1. As previously described, the laser receiver 200 is constituted by the main casing unit 210 and the stand unit 230 (not shown in FIG. 3). The respective blocks within broken lines shown in the block diagram indicate components of the main casing unit 210. Also in this FIG. 3, similarly to FIG. 2, thin arrows indicate paths of electric signals, thick arrows indicate mechanical actions, and arrows of single dotted lines indicate optical paths.

The control unit 215 is a unit including a CPU therewithin and has a function to control the entirety of this laser receiver 200. As indicated by a single dotted line in the figure, the reflected beam B2 from the target 410 is conducted to a prism P1 through an optical system O3. In the case where the prism P1 is located at the position indicated by the solid lines in the figure, the reflected beam B2 travels in the left direction of the figure to reach the image pick-up surface of the CCD camera 216. In this case, the path of the reflected beam B2 is called a first path. On the other hand, a prism drive motor 217 operative on the basis of instruction from the control unit 215 has a function to rotationally drive the prism P1 so that it is located at the position indicated by the broken lines. When the prism P1 is located at the position of the broken lines, the reflected beam B2 travels in the right direction of the figure to reach the light receiving surface of a photo-cell 218 via a prism P2. In this example, such a path of the reflected beam B2 is called a second path. The photo-cell 218 outputs a voltage signal corresponding to light quantity of the reflected beam B2 received. This voltage signal is delivered to a sound circuit 219 in which only a voice band component is extracted.

In the middle portion of the second path through which the reflected beam B2 travels, there is disposed a knife edge 220 for shielding a portion of the reflected beam B2. The light shielding position by this knife edge 220 is adjusted by a stepping motor 221. The control unit 215 gives instruction to the stepping motor 221, thereby making it possible to adjust the light shielding position by the knife edge 220.

A console panel 211, a coordinate display unit 212 and a target display unit 213 shown at the bottom portion of FIG. 3 are components provided on the side surface or the back face of the main casing unit 210 as shown in FIG. 1. The console panel 211 is composed of operation buttons for allowing the operator to give various instructions to the control unit 215, and indicators for allowing the control unit 215 to inform the operator of the operational situations. Moreover, in this embodiment, a voltage meter M for indicating a voltage value that the photo-cell 218 outputs, an output terminal T1 for outputting a voice band signal extracted by the sound circuit 219 to an external earphone and an output terminal T2 for outputting such a voice band signal to an external recording unit are provided on the console panel 211. The final object in this voice monitoring system according to this invention is to obtain a voice band signal from these output terminals T1, T2.

Further, on the coordinate display unit 212 of the laser receiver 200 side, coordinates which indicate a scanning position of the laser beam B1 at a current time point are displayed. As previously described, an X-coordinate value and a Y-coordinate value indicating a scanning position at a current time point are transmitted as radio wave from the antenna 114 of the laser transmitter 100. The laser receiver 200 receives this radio wave through an antenna 214 to obtain the X-coordinate value and the Y-coordinate value. These coordinate values are transmitted to the control unit 215 through a communication interface unit 222. The control unit 215 delivers the X-coordinate value and the Y-coordinate value to the coordinate display unit 212 so that they are displayed. Eventually, exactly the same coordinate values as those of the coordinate display unit 112 of the laser transmitter 100 are displayed on the real time basis on the coordinate display unit 212 of the laser receiver 200. Since the operator could find out the coordinate values displayed on the coordinate display unit 212, it becomes possible for the operator to recognize, on the real time basis, a scanning position of the laser beam B1 at a current time point even though he/she is standing in the vicinity of the laser receiver 200.

On the other hand, the target display unit 213 has a function to display an picture image taken by the CCD camera 216 as it is. In this embodiment, a typical CCD camera for taking a monochromatic image is used as the CCD camera 216, and this CCD camera has sensitivity also in the near-infrared band of the laser beam. Accordingly, when the reflected beam B2 from the target 410 is received as shown in FIG. 1, a picture of the laser spot Q is taken by the CCD camera 216 along with a picture of the target 410. A picture signal outputted from the CCD camera 216 is delivered to the target display unit 213 through the control unit 215. It is a matter of course that the picture signal of the CCD camera 216 may be directly delivered to the target display unit 213 without intervening the control unit 215.

As the target display unit 213, a typical CRT display is used similarly to the target display unit 113, and such a CRT display unit is provided on the back face of the main casing unit 210 as shown in FIG. 1. By watching a picture displayed on the target display unit 213, the operator can confirm an actual position of the laser spot Q formed on the target 410 (i.e., irradiation position of the laser beam B1). A doted image IQ* displayed on the target display unit 213 of FIG. 1 indicates an image of the laser spot Q.

In the laser receiver 200, two different operations will be carried out in dependency upon whether the reflected beam B2 takes the first path (path of the left direction of the figure) or the second path (path of the right direction of the figure) as stated above. Namely, in the case where the reflected beam B2 takes the first path, an image is taken by the CCD camera 216. Thus, a position of the laser spot Q is displayed on the target display unit 213. The operator can confirm whether or not the reflected beam B2 from the target 410 is correctly received in a preparatory stage by observing a picture on the target display unit 213. If correct light receiving can be confirmed, the operator operates the console panel 211 to give an instruction to switch the path of the reflected beam B2. The control unit 215 which has received this instruction sends a drive signal to the prism drive motor 217 to rotate the prism P1 so that it is located at a position of the broken lines of the figure. Thus, the reflected beam B2 becomes to take the second path. The knife edge 220 and the photo-cell 218 existing on the second path function as a position change detecting unit. Namely, a very small positional change of the reflected beam B2 is detected as an electric signal and is outputted. The detail of the principle of this detection will now be described later.

Eventually, the prism P1 will have a function to selectively provide either one of the first path and the second path. While the rotational movement of the prism P1 is carried out by the prism drive motor 217 based on an instruction from the control unit 215 in this embodiment, the drive shaft of the prism P1 may be directly rotated by hand to thereby carry out switching of the path manually. In this case, prism drive motor 217 becomes unnecessary.

§4 Configuration of the Beam Detector 300

Figure 4:
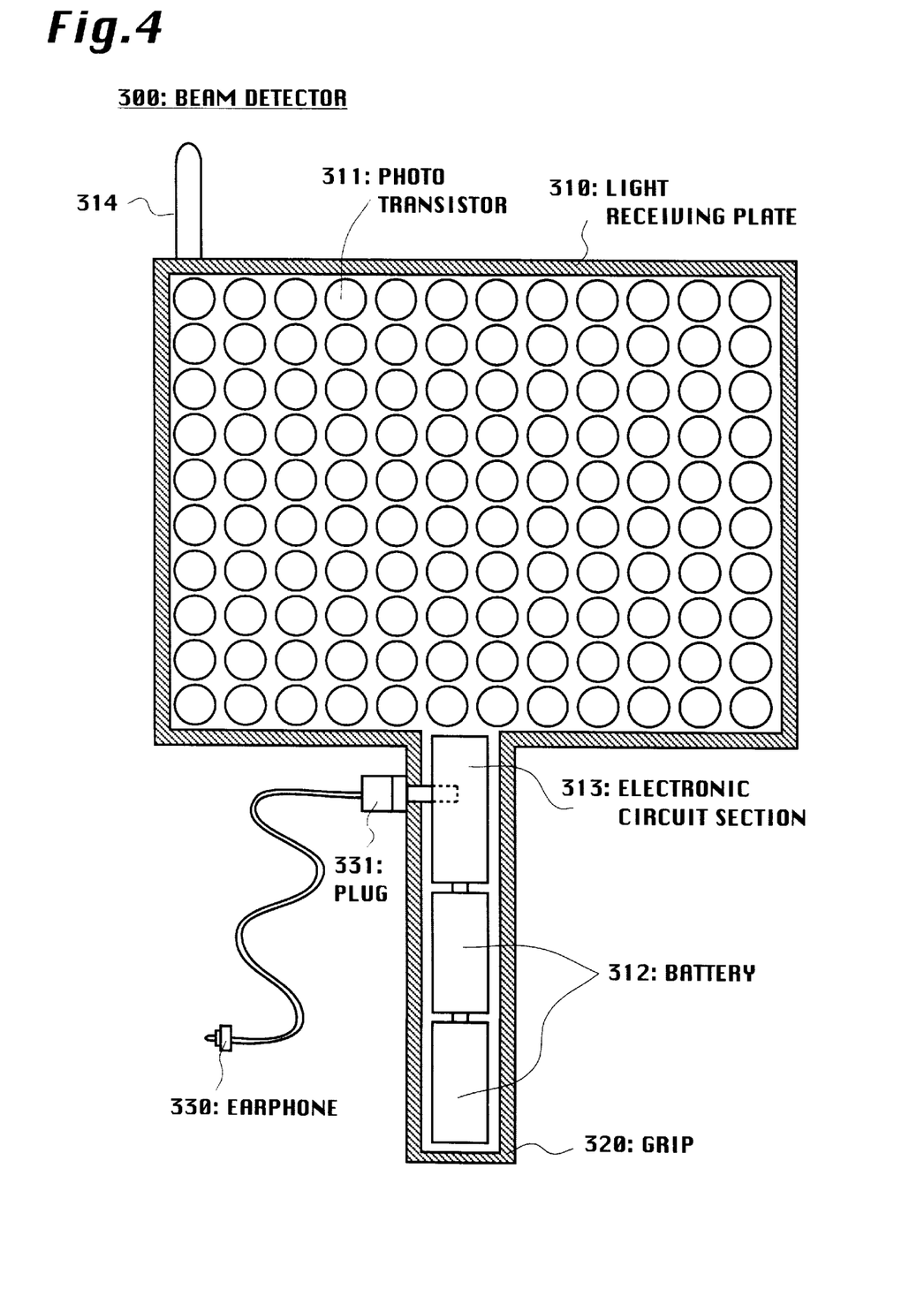
FIG. 4 is a structural view showing an internal configuration of the beam detector 300 shown in FIG. 1.

FIG. 4 is a structural view showing an internal structure of the beam detector 300 shown in FIG. 1. The main structure of this beam detector 300 is a light receiving plate 310 in flat plate form with a columnar grip 320. A large number of photo-transistors 311 are arranged in breadth and width directions on the light receiving plate 310. Individual photo-transistors 311 become operative in response to light of wavelength of the reflected beam B2. Batteries 312 and an electronic circuit section 313 are included within the grip 320. Electric power from the batteries 312 is delivered to the respective photo-transistors 311 and the electronic circuit section 313. In the electronic circuit section 313, there is a circuit for controlling the operation of this beam detector 300. Namely, when the reflected beam B2 is irradiated onto at least one of the photo-transistors 311 arranged on the light receiving plate 310, an electric signal indicating detection of the beam is transmitted from the corresponding transistor to the electronic circuit section 313.

The electronic circuit section 313 executes two operations when it receives the transmitted electronic signal. The first operation is to inform the operator of existence of the reflected beams B2. In this embodiment, a jack for inserting a plug 331 of an earphone 330 is provided. When the existence of the reflected beam B2 is to be informed, the electric circuit section 313 delivers a predetermined sound signal to the earphone jack. Accordingly, the operator who has fitted the earphone 330 can recognize the fact that the reflected beam B2 hits any portion of the light receiving plate 310 by hearing voice presented from the earphone 330. The second operation of the electronic circuit section 313 is to transmit, to the laser transmitter 100 by radio wave, the information that the reflected beam B2 has been located onto the light receiving plate 310. Namely, when any one of the photo-transistors 311 detects the reflected beam B2, a signal indicating beam detection is immediately transmitted through the antenna 314 to the external. Thus, the laser transmitter 100 can recognize this information on the real time basis.

Figure 5:
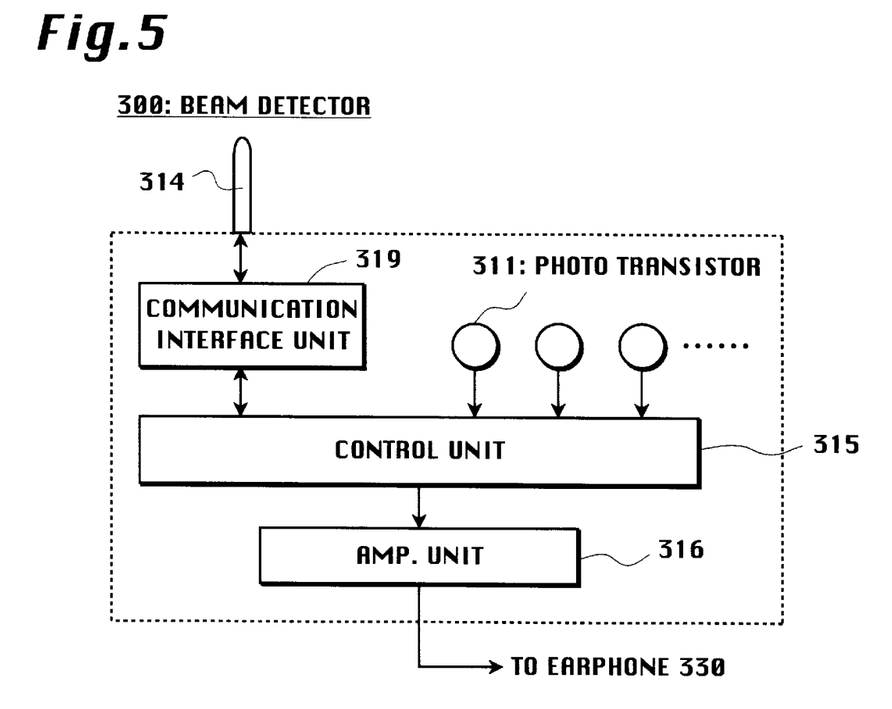
FIG. 5 is a block diagram showing an internal configuration of the beam detector 300 shown in FIG. 1.

FIG. 5 is a block diagram in which components for processing electric signals within the beam detector 300 shown in FIG. 4 are extracted. In this example, a control unit 315, an amplifier unit 316, and a communication interface unit 319 are included within the electronic circuit section 313 shown in FIG. 4. Output voltages of the respective photo-transistors 311 are monitored by the control unit 315. When a change takes place in any one of these output voltages, the control unit 315 judges that the reflected beam B2 has been detected and starts to execute the above-described two operations. Namely, the control unit 315 executes the first operation for delivering a predetermined sound signal to the amplifier unit 316 and executes the second operation for delivering a predetermined information signal to the communication interface unit 319.

The sound signal given to the amplifier unit 316 by the first operation is presented as an alarm sound through an earphone 330 connected to the external. Any sound may be employed for this purpose as far as it performs a role to inform the existence of the reflected beam B2 to the operator. It is to be noted that, in this embodiment, an unique method for making sound is applied for the purpose of lessening load of the control unit 315. As previously described, the semiconductor laser 116 within the laser transmitter 100 can operate in two kinds of modes of the continuous mode and the modulation mode. The continuous mode is a mode for executing voice monitor operation intrinsic to this system, whereas the modulation mode is a mode for realizing convenience in executing the detection work of the reflected beam B2 using the beam detector 300. When the semiconductor laser 116 is operating in the modulation mode, the laser beam B1 is irradiated as a modulated signal having a predetermined audible frequency. For example, when the modulation is carried out by a frequency signal of 1000 Hz, the laser beam B1 is intermittently irradiated at frequency of 1000 Hz, and the reflected beam B2 becomes an intermittent beam modulated at the same frequency as above. When the reflected beam B2 modulated in this way is irradiated to the beam detector 300, an output voltage of the photo-transistor 311 is modulated with 1000 Hz. In view of the above, when the output voltage of this transistor is delivered to the amplifier unit 316 as it is, a sound signal of 1000 Hz can be presented from the earphone 330. By implementing such a method (method of operating the semiconductor laser 116 in the modulation mode), the load for executing the first operation of the control unit 315 is lessened to much degree. In other words, it is possible to employ a configuration for applying an output voltage of the photo-transistor transitor 311 to the amplifier unit 316 as it is without providing the control unit 315.

Moreover, it is not necessarily required to carry out modulation with respect to the semiconductor laser 116 by using a signal of a single frequency, but the modulation can be also carried out by, e.g., speech signal. In this case, it is also possible to deliver a voice message from the first operator who operates the laser transmitter 100 to the second operator who is carrying out the detection work of the reflected beam B2 using the beam detector 300. Namely, if a voice processing circuit is included in the laser transmitter 100 to convert voice of the first operator into a speech signal and the modulation with respect to the semiconductor laser 116 is carried out on the basis of this speech signal, the second operator can hear voice of the first operator from the earphone 330.

On the other hand, as a second operation, the control unit 315 carries out signal transmission by radio wave toward the external through the antenna 314. The transmitted signal by radio wave contains the information that the reflected beam B2 is detected by the beam detector 300. In this embodiment, the beam scanning mechanism of the laser transmitter 100 can be controlled on the basis of this transmitted signal. Namely, a signal transmitted through the antenna 314 functions as a scanning control signal with respect to the laser transmitter 100. The laser transmitter 100 can stop scanning with a beam or reverse the scanning direction when this scanning control signal is transmitted. Such a processing will now be described later.

§5 Principle of the Voice Monitoring Process

The configurations of the laser transmitter 100, the laser receiver 200 and the beam detector 300 which serve as fundamental elements of this voice monitoring system respectively have been already described in the former chapters. By the explanation in these chapters, it is believed that the outline of operation of this voice monitoring system has been sufficiently understood. In this chapter, the principle of voice monitor processing carried out within the laser receiver 200 will be described in more detail.

Figure 6:
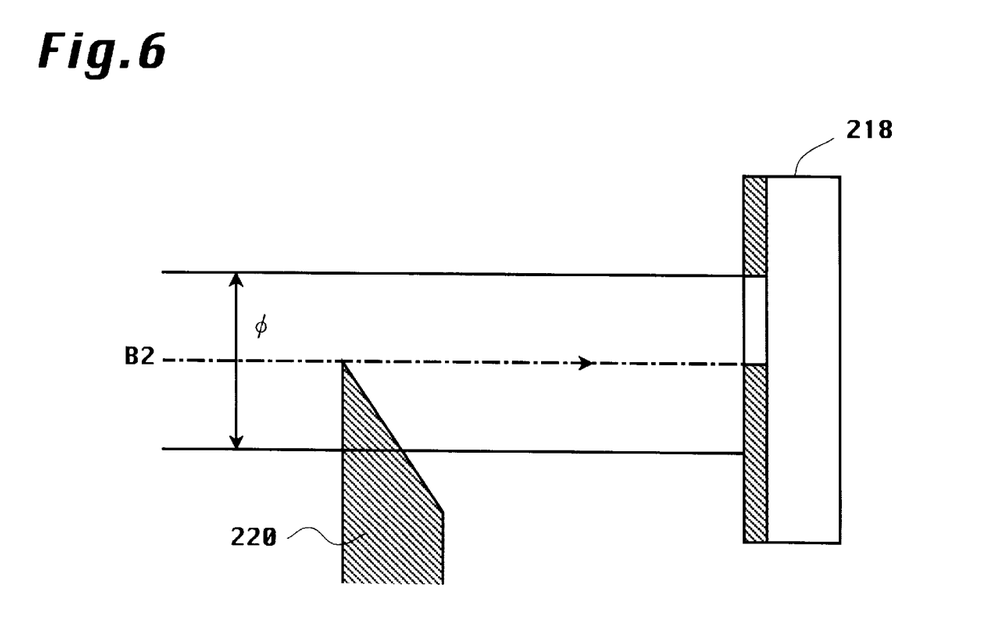
FIG. 6 is a side cross sectional view showing a principle of operation of the position change detecting unit of the laser receiver 200 shown in FIG. 1.
Figure 7:
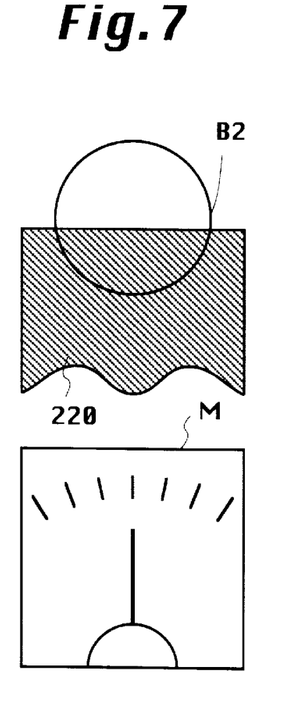
FIGS 7, 8 and 9 are front views (enlarge views) showing the principle of operation of the position change detecting unit of the laser receiver 200 shown in FIG. 1.
Figure 8:
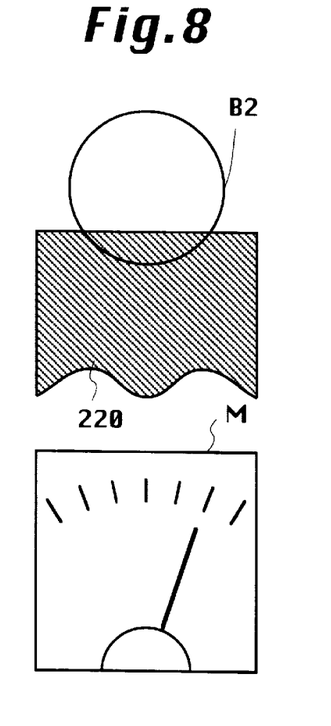
Figure 9:
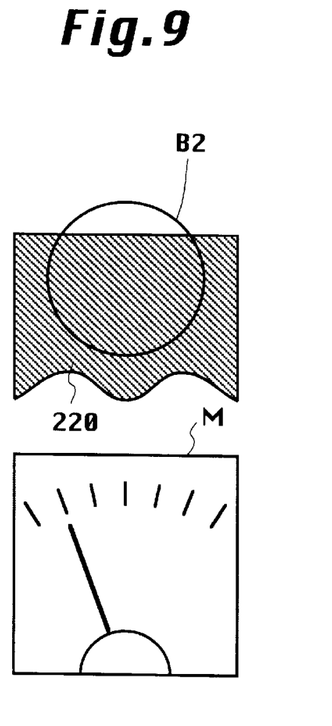

As shown in FIG. 3, when the second path is selected by the prism P1, the reflected beam B2 from the target 410 is guided to the position change detecting unit consisting of the knife edge 220, the prism P2 and the photo-cell 218 which are located in the upper right area of the figure. In practice, the reflected beam B2 comprises light flux having a diameter of φ. The knife edge 220 is inserted into the position where a portion of this light flux is shielded. Let now consider the case where the knife edge 220 is inserted into a central position of the reflected beam B2 as shown in the side view of FIG. 6. In this case, since a lower half of the reflected beam B2 is shield, only an upper half thereof is irradiated onto the photo-cell 218. Namely, light is irradiated only onto the region where no hatching is implemented of the light receiving surface indicated on the left side of the photo-cell 218 of the figure. The figures indicated on the upper portions of FIGS. 7 to 9 are views showing positional relationship between the reflected beam B2 and the knife edge 220 within a plane perpendicular to the optical axis of the reflected beam B2, and the figures indicated on the lower portions thereof indicate displays of the voltage meter M provided on the console panel 211. As shown in FIG. 7, in the state where a lower half of the reflected beam B2 is shield by the knife edge 220, the voltage meter M indicates a medium value. On the other hand, as shown in FIG. 8, when the reflected beam B2 causes a displacement in an upper direction as shown in FIG. 8, an indication value of the voltage meter M increases because the light shielding area becomes small. When the reflected beam B2 causes a displacement in a lower direction as shown in FIG. 9 in a manner opposite to the above, an indication value of the voltage meter M decreases because the light shielding area becomes large.

As previously described, the reflected beam B2 causes a positional change on the basis of vibration of the target 410. Accordingly, a vibrational component based on voice within the room of the building 400 is included in a positional change of the reflected beam B2. Eventually, the voice component within the room to be monitored is included in an electric signal outputted from the photo-cell 218. In view of the above, if processing for extracting only a voice band component in the sound circuit 219, voice as a target can be taken out as a signal. This voice signal is outputted through the output terminals T1, T2, and can be monitored by the earphone or can be recorded by a recording unit of the external.

Though only one-dimensional change component (vertical component in FIGS. 7 to 9) of the reflected beam B2 is detected in the method using the above-described knife edge 220, it may be sufficient. Of course, both directional components of a horizontal component and a vertical component are included in vibration produced on the window pane. However, such a vibration based on conversation within a room is considered to generally have no special directivity. Accordingly, it is sufficient to detect only one-dimensional vibrational component.

§6 Meaning of Scanning with Laser Beam

One feature of the voice monitoring system according to this invention is that the laser transmitter 100 has a function to scan-with the laser beam B1. The reason why such a beam scanning function is provided is nothing but to facilitate detecting work of the reflected beam B2. In this chapter, how detecting work of the reflected beam B2 is caused to be effective by addition of this beam scanning function will be described.

Figure 10:
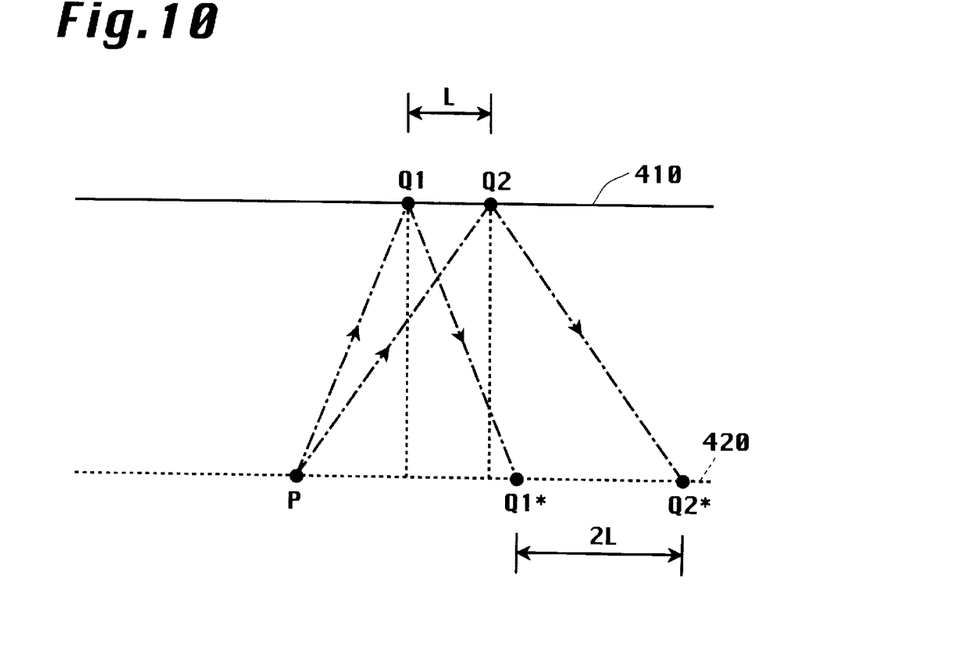
FIG. 10 is a top view showing a laser beam irradiated from the laser transmitter 100 shown in FIG. 1.

FIG. 10 is a top view showing a laser beam irradiated from the laser transmitter 100 shown in FIG. 1. In this example, a point P indicates an installation point of the laser transmitter 100 and the target 410 is a complete plane. Let assume that a laser beam is irradiated from the point P toward a point Q1 or Q2 on the target 410. Directions of the reflected beam obtained in the respective cases are shown in the figure on the basis of the optical principle that an incident angle and a reflection angle on the target 410 are equal to each other. Namely, a laser beam irradiated onto the point Q1 reaches a position of the point Q1* and a laser beam irradiated onto the point Q2 reaches a position of the point Q2* (point P, point Q1* and point Q2* are all assumed to be on the observation surface 420 which is in parallel to the target 410). In this case, if a distance between points Q1 and Q2 is assumed to be L, a distance between points Q1* and Q2* becomes equal to 2L. It means that, when a laser spot Q is moved by a distance L on the target 410, a laser spot Q* on the observation surface 420 is moved by the double distance of 2L.

Figure 11:
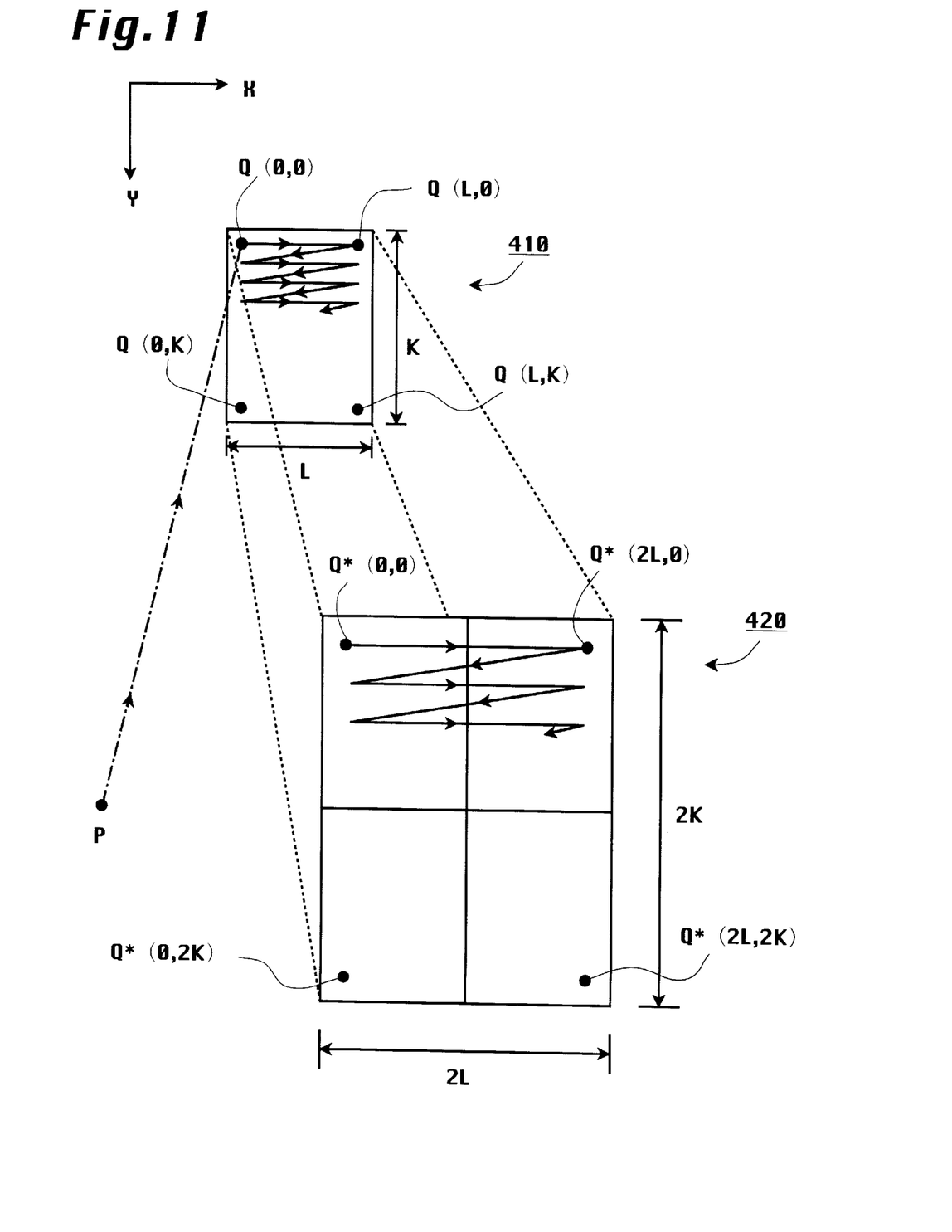
FIG. 11 is a perspective view showing scanning mode of laser beam irradiated from the laser transmitter 100 shown in FIG. 1.

When a laser beam is two-dimensionally moved in scanning, a movement range of the laser spot Q* on the observation surface 420 becomes four times with respect to a movement range of the laser spot Q on the target 410. For example, as shown in FIG. 11, an X-axis is taken in the horizontal direction and a Y-axis is taken in the vertical direction so that an XY coordinate system is defined on the target 410. Further, a laser beam irradiated from the point P is assumed to be moved in scanning so as to move the laser spot Q on the target 410 in the right direction of the figure from a position of point Q(0, 0) to point Q(L, 0), to subsequently successively return the laser spot Q to the left end, to move the laser spot Q in the right direction of the figure from a position of point Q(0, 1) to point Q(L, 1), . . . , to finally move it in the right direction of the figure from a position of point Q(0, K) to Q(L, K). In this case, the movement range of the laser spot Q on the target 410 is within a rectangular area having width L and height K. On the other hand, the movement range of the laser spot Q* on the observation surface 420 is within a rectangular area having width 2L and height 2K in which point Q*(0, 0), point Q*(2L, 0), point Q*(0, 2K) and point Q*(2L, 2K) are to be four vertices.

Such beam scanning procedure is very effective to improve a hitting probability of the reflected beam B2 onto the light receiving plate 310. Namely, as far as the light receiving plate 310 exists at any position within the space between the rectangular area on the target 410 and the rectangular area on the observation surface 420, detection of the reflected beam B2 is made at a specific time point during the beam scanning procedure. As mentioned before, the reflected beam B2 cannot be observed by naked eyes. Therefore, this beam scanning procedure facilitates the detecting work for the reflected beam B2 very much.

§7 Voice Monitor Operation Using this System

Figure 12:
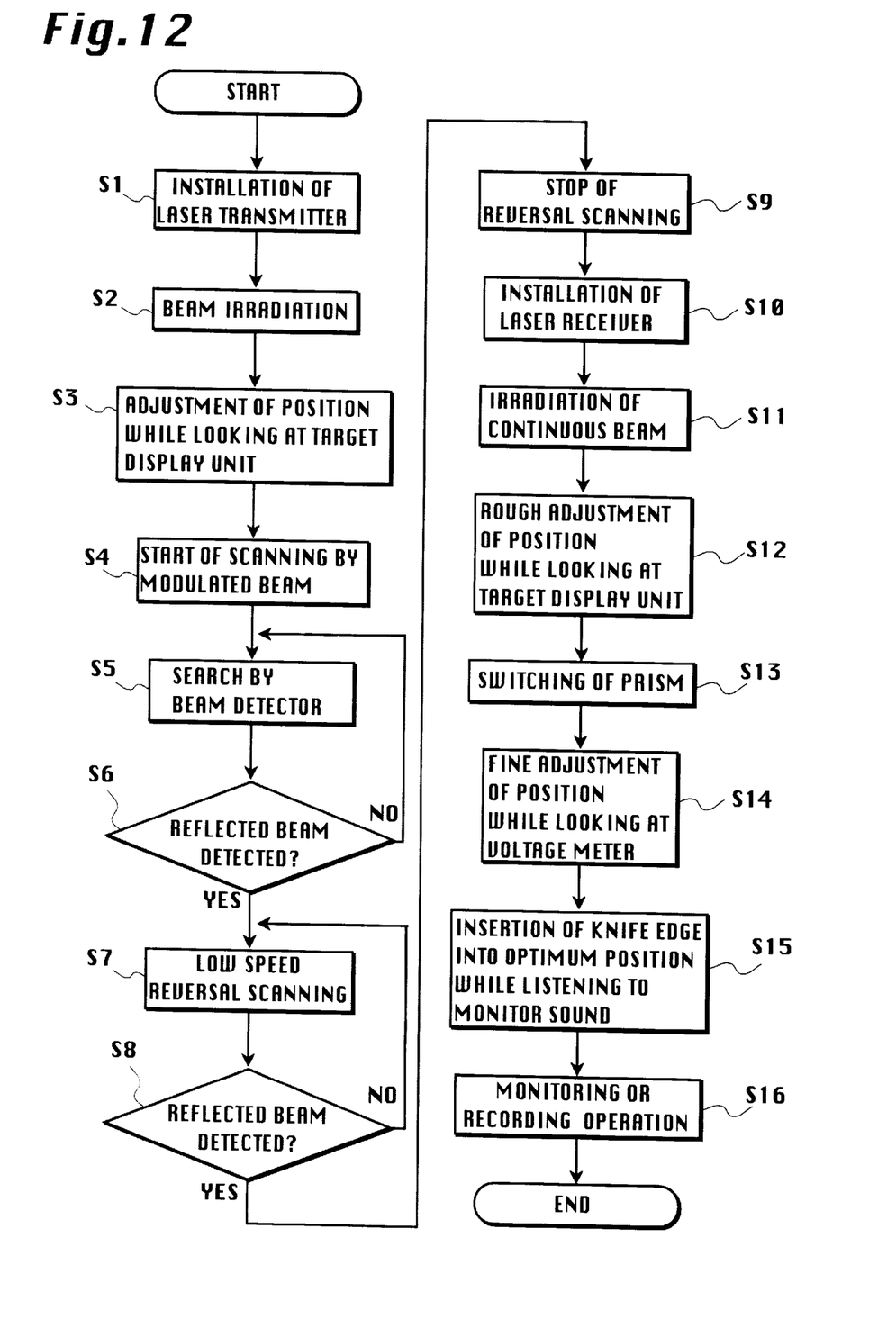
FIG. 12 is a flowchart showing a procedure of monitor preparation work using the voice monitoring system shown in FIG. 1.

Finally, the procedure for voice monitor operation using this system will now be described with reference to the flowchart of FIG. 12 in more detail. Explanation will be given in a case where conversation within a room of the building 400 should be recorded in secret manner as shown in FIG. 1.

Initially, at step S1, an installation of the laser transmitter 100 is carried out. The laser transmitter 100 may be installed at any position as far as the laser beam B1 can be irradiated onto the target 410. It is to be noted that, in practice, the laser transmitter 100 should be installed at a stable place without vibration. Subsequently, at step S2, the laser beam B1 is irradiated. At this time point, the operation mode of the semiconductor laser 116 may be any one of the continuous mode and modulation mode. In this example, irradiation of the laser beam is assumed to be carried out in the modulation mode by taking into consideration the fact that the detecting work will be carried out later. As a target for irradiating the laser beam B1, a window pane, etc. faced to the outdoor may be ordinarily utilized. It is to be noted that any object may be employed as a target as far as such an object produces vibration based on voice in a room and has a property for specularly reflecting the laser beam B1. For example, a mirror, an ashtray, an ornament, or a tablet, etc. within a room may be utilized as a target.

When the laser beam B1 is irradiated onto the target 410, its state is displayed on the target display unit 113 provided on the back face of the main casing unit 110 as previously described. Since the optical axis of the scope unit 120 is adjusted in advance in correspondence with the optical axis of the semiconductor laser 116, if the laser beam B1 is irradiated on the target 410, an image IQ of a laser spot Q is displayed on the target display unit 113 without particular adjustment. As stated above, an actual laser spot Q formed on the target 410 cannot be recognized by the naked eyes, but it is possible to confirm it as an image IQ on the target display unit 113. In view of the above, at step S3, adjustment of irradiation position of the laser beam B1 is carried out if necessary. Namely, when it is confirmed on the target display unit 113 that the laser spot Q is out of position of the target 410, installation state adjustment means provided at the stand unit 130 is manipulated to adjust position, angle and direction of the entirety of the main casing unit 110.

If the proper installation of the laser transmitter 100 is completed in this way, then the installation of the laser receiver 200 is subsequently carried out. However, the degree of freedom of an installation position of the laser receiver 200 is remarkably limited. Namely, a proper installation position is limited to positions where the reflected beam B2 from the target 410 can be correctly received. Since the reflected beam B2 itself cannot be confirmed by the naked eyes as previously described, a work for finding out a proper installation position of the laser receiver 200 is considerably hard. Particularly, in the case where conversation within the room should be recorded in a secret manner, it is necessary to install the laser transmitter 100 and the laser receiver 200 at a considerably remote position so that the concerned person in the room cannot notice them. As stated above, the work for catching invisible light from a remote position is a hard work more than imagined. In the voice monitoring system according to this invention, since there are a scanning device with the laser beam B1 and a dedicated device of the beam detector 300, it is possible to lessen labor of the work.

Initially, at step S4, the laser beam B1 is irradiated in the modulation mode and beam scanning is carried out. At step S5, search work by the beam detector 300 is started. Namely, the operator holds the grip 320 of the beam detector 300 to proceed with search while holding the light receiving plate 310 at a place where the reflected beam B2 is deemed to exist. At this time, the operator pays attention to alarm sound presented from the earphone 330. In practice, it is preferable to proceed with this search work by team play of the first operator for operating the laser transmitter 100 and the second operator walking around with the beam detector 300 on hand. The first operator can recognize that correct beam scanning is carried out by observing an image IQ moving on the target display unit 113. Moreover, coordinate values displayed on the coordinate display unit 112 can be confirmed, thereby making it possible to recognize a scanning position at a current time point with high accuracy. Scanning speed of the laser beam is adjusted in accordance with movement speed of the second operator so that suitable speed is provided. In general, it is preferable to set the scanning speed sufficiently higher than the movement speed of the second operator, because multiplicative effect of movement of the operator and scanning with the beam can be expected.

When the reflected beam B2 hits to any position of the light receiving plate 310 during such search work, beep sound of 1000 Hz is presented from the earphone 330 to the ear of the second operator. This beep sound was included in the laser beam B1 irradiated in the modulation mode. When the second operator hears the beep sound, search work is immediately stopped at that position to allow the beam detector 300 to exist at the position held at present. On one hand, a detection signal, which indicates that the beam is detected, is transmitted from the beam detector 300 to the laser transmitter 100 by radio wave. As previously described, this detection signal functions as a scanning control signal. When the scanning control signal is transmitted from the beam detector 300 to the laser transmitter 100, the control unit 115 in the laser transmitter 100 immediately stops scanning at a present scanning position. If beam scanning can be stopped at an exact time point when the reflected beam B2 has just been detected by the beam detector 300, it is possible to capture the reflected beam B2 at a present position of the second operator.

However, in practice, a time lag might take place to some degree between the time point when the reflected beams B2 has just hit the light receiving plate 310 and the time point when the beam scanning is actually stopped. That is, in the case where the beam scanning is carried out at a speed to some degree, when the laser transmitter 100 stops the beam scanning, the reflected beam B2 may have been already passed through the light receiving plate 310. In view of this, in this embodiment, if the first scanning control signal is transmitted from the beam detector 300, the laser transmitter 100 starts reversal scanning in a direction opposite to the above at a speed lower than an ordinary scanning speed. Namely, when the reflected beam is detected at step S6, low speed reversal scanning is started at the subsequent step S7. If the second operator stops walking and maintains stationary state for a time period during which the low speed reversal scanning is carried out, the reflected beam B2 which has been once passed is returned onto the light receiving plate 310 for a second time. When the reflected beam B2 is detected for a second time by the beam detector 300, the second scanning control signal is transmitted from the beam detector 300 to the laser transmitter 100. When the laser transmitter 100 receives the second scanning control signal, it immediately stops the reversal scanning (step S9). Since the reversal scanning is carried out at a low speed, even if a time lag takes place, the reflected beam B2 is stopped substantially at a position on the light receiving plate 310. The second operator keeps hearing the beep sound of 1000 Hz from the earphone 330 at that position. Thus, the reflected beam B2 can be captured.

When the reflected beam B2 has been captured in this way, it is sufficient to essentially install the laser receiver 200 at that position. Namely, at step S10, an installation of the laser receiver 200 is carried out by the second operator. Meanwhile, as previously described, coordinate values, which indicate a scanning position of the beam at a current time point and are transmitted from the laser transmitter 100 to the laser receiver 200 by radio signal, are displayed on the coordinate display unit 212 of the laser receiver 200 In other words, the coordinate display unit 112 on the laser transmitter 100 and the coordinate display unit 212 on the laser receiver 200 are interlocking with each other. Therefore, the second operator can change the installation place of the laser receiver 200 as occasion demands while confirming the displayed coordinate values. For example, if there are any unfavorable circumstances in the installation place of the laser receiver 200 such that the ground is unstable or the load surface is inclined with respect to the current position, it is necessary to find out a new installation place. Further, if the laser receiver 200 is moved to a new place, it is necessary to slightly modify the scanning position of the laser beam so that the reflected beam B2 can be received at this new installation place. In such a case, it is very convenient to refer the coordinate values displayed on the coordinate display unit 212. For example, if a scanning position of beam at a current time is close to the right end of the scanning area, the second operator can recognize that it is not preferable to take a new installation place on the right side relative to the current position. In addition, since coordinate values indicating a scanning position can be also converted into a rough distance, when a new installation place is determined, it is possible to also determine a modification value for a scanning position of beam.

After the installation of the laser receiver 200 is completed in this way, the mode of beam irradiation is subsequently switched into the continuous mode at step S11 to carry out irradiation of a continuous beam. In order to switch the irradiation mode of beam, the prism P1 in the laser receiver 200 is rotated so as to guide the reflected beam B2 to the first path. Thus, the reflected beam B2 reaches the image pick-up surface of the CCD camera 216. As a result, an image IQ* of the laser spot Q on the target 410 is displayed on the target display unit 213. In view of this, at step S12, rough adjustment of position for the main casing unit 210 is carried out while looking at the target display unit 213. Namely, installation state adjustment means provided on the stand unit 230 is manipulated to adjust position, angle and direction of the entirety of the main casing unit 210 so that the image IQ* is displayed at a central position of the target display unit 213. When the rough adjustment of position is completed while looking at the target display unit 213 in this way, the reflected beam B2 is incident substantially to a central position of the optical system O3, thus making it possible to easily carry out fine adjustment of position which will be carried out later.

When the rough adjustment of position is now completed, switching of the prism P1 is carried out at step S13. Namely, the prism drive motor 217 is driven to rotate the prism P1 to guide the reflected beam B2 to the second path. At this time, the knife edge 220 is kept in a withdrawn state by stepping motor 221 to maximum degree so that the reflected beam B2 is not shielded at all by the knife edge 220. Thus, all the light flux of the reflected beam B2 is irradiated onto the light receiving surface of the photo-cell 218. In view of the above, at step S14, fine adjustment of position is carried out while looking at the voltage meter M. The aim of this fine adjustment is to guide the reflected beam B2 to the highest sensitivity region of the light receiving surface of the photo-cell 218. In the typical photo-cell 218, the sensitivity in the vicinity of the center of the light receiving surface is the highest. In view of the above, the operator manipulates the installation state adjustment means provided on the stand unit 230 while looking at the voltage meter M to finely adjust position, angle and direction of the entirety of the main casing unit 210 so that an indicated value of the voltage meter M becomes maximum.

When the rough adjustment and the fine adjustment relating to the installation position of the laser receiver 200 are completed, the laser receiver 200 is installed at an optimum position for receiving the reflected beam B2. Then, at the subsequent step S15, adjustment of insertion position of the knife edge 220 is carried out. In order to make the dynamic range of monitoring voice the broadest, it may be optimum in a theoretical point of view to insert the knife edge 220 until its end portion reaches a central position of light flux of the reflected beam B2 as shown in FIG. 6. However, in a practical point of view, it is preferable to find, by trial and error using operator's ear, an optimum position at which the most recognizable monitored voice can be obtained. In view of this, the operator connects the earphone to the output terminal T1 on the console panel 211 and gives a movement instruction for the knife edge 220 manipulating the console panel 211, while directly hearing a monitored voice from the earphone to search an optimum position where it is considered that the voice can be heard most clearly.

When the optimum insertion position of the knife edge 220 is determined, monitoring or recording operation is carried out at step S16. That is, the voice is monitored by the earphone or recorded using a voice recording equipment connected to the external.

While this invention has been explained in accordance with the embodiment shown, the present invention is not limited to this embodiment, but may be carried out in various forms in addition to the above. For example, the beam detector 300 used for searching the reflected beam B2 is not essential. In the case where a distance between the laser transmitter 100 and the target 410 is relatively short, it is enough to carry out beam scanning by the laser transmitter 100 to directly capture the reflected beam B2 by the laser receiver 200. Moreover, the signal transmitting means by radio wave between the laser transmitter 100, the laser receiver 200 and the beam detector 300 are additional components. Therefore, even if they are omitted for the purpose of reduction of cost, great hindrance does not take place. Further, while the coordinate display unit 112 and the target display unit 113 are respectively realized by separate hardwares in the above-described embodiment, they may be shared by a single hardware. This similarly applies to the coordinate display unit 212 and the target display unit 213.

Industrial Applicability

The voice monitoring system using laser beam according to this invention can be widely utilized for monitoring voice within a room from the outside. Particularly, since monitoring can be made from a remote place and a laser beam of invisible wavelength band is utilized, conversation can be monitored in such a manner that the concerned person within the room cannot notice. Thus, this is effective for utilization of information collecting activity by a criminal investigation service or a military service.

What is claimed is:

1. A voice monitoring system using laser beam for monitoring voice within a room from an outside of the room, the system comprising:
   a laser transmitter (100) for irradiating a laser beam (B1) of invisible wavelength band toward a predetermined target (410) to be monitored; and
   a laser receiver (200) for converting a positional change of a reflected beam (B2) from the target (410) into an electric signal and extracting a voice band component from the electric signal to output it,
      wherein a beam scanning mechanism (117, 118) for scanning with a laser beam (B1) is provided in the laser transmitter (100) so that a laser spot (Q) formed on the target (410) by irradiation of the laser beam (B1) can be moved within a plane of the target (410).

2. A voice monitoring system using laser beam according to claim 1,
   wherein the laser receiver (200) includes:
      a knife edge (220) provided along an optical path of the reflected beam (B2) from the target (410) for shielding a portion of said reflected beam;
      a shielding position adjustment device (221) for adjusting a shielding position of said knife edge (220); and
      a light receiving element (218) to receive light flux of the reflected beam (B2) which has not been shielded by the knife edge (220) and to output an electric signal corresponding to energy of received light flux; thus to convert a positional change of the reflected beam into an electric signal.

3. A voice monitoring system using laser beam as set forth in claim 2:
   wherein the laser transmitter (100) includes a coordinate display unit (112) for displaying coordinates indicating a scanning position at a current time of the laser beam (B1) and a communication device (114, 119) for transmitting a signal indicative of the coordinates to the laser receiver (200); and
   wherein the laser receiver (200) includes a communication device (214, 222) for receiving the signal indicative of the coordinates transmitted from the laser transmitter (100) and a coordinate display unit (212) for displaying the coordinates.

4. A voice monitoring system using laser beam as set forth in claim 2, wherein there is further provided a beam detector (300) including:
   a light receiving plate (310) in which a plurality of light receiving elements (311) are arranged, each of said light receiving elements producing an electric signal when it receives a reflected beam (B2) from the target (410); and
   a signaling unit (313, 330) for informing of existence of the reflected beam (B2) on the basis of said electric signal.

5. A voice monitoring system using laser beam as set forth in claim 4:
   wherein the laser transmitter (100) has a function to operate in two modes of a continuous mode for irradiating a laser beam (B1) as a continuous signal and a modulation mode for irradiating a laser beam (B1) as a modulated signal having a predetermined audible frequency; and
   wherein the signaling unit in the beam detector (300) is constituted by a unit (313, 330) having a function to present sound of said audible frequency by using the modulated signal when a reflected beam (B2) produced in the modulated mode is received.

6. A voice monitoring system using laser beam as set forth in claim 2, wherein there is further provided a beam detector (300) including:
   a light receiving plate (310) in which a plurality of light receiving elements (311) are arranged, each of said light receiving elements producing an electric signal when it receives a reflected beam (B2) from the target (410); and
   a communication device (314, 319) for transmitting, to the laser transmitter (100), a scanning control signal for controlling the beam scanning mechanism (217, 218) on the basis of said electric signal.

7. A voice monitoring system using laser beam according to claim 1,
   wherein the laser receiver (200) includes:
      a CCD camera (216) having a sensitivity for a wavelength of the laser beam (B1);
      a target display unit (213) for displaying an image taken by said CCD camera (216);
      a positional change detecting unit (218, 220) for converting a positional change of the reflected beam (B2) from the target (410) into an electric signal;
      a sound circuit (219) for extracting a voice band component from said electric signal;
      an optical device (P1, 217) for selectively forming a first path for guiding the reflected beam (B2) from the target (410) to said CCD camera (216) and a second path for guiding the reflected beam to said positional change detecting unit (218, 220); and an installation state adjustment device (230) for adjusting an installation state of the laser receiver (200).

8. A voice monitoring system using laser beam according to claim 7, wherein the laser receiver (200) includes:

a knife edge (220) provided along an optical path of the reflected beam (B2) from the target (410) for shielding a portion of said reflected beam;

a shielding position adjustment device (221) for adjusting a shielding position of said knife edge (220); and a light receiving element (218) to receive light flux of the reflected beam (B2) which has not been shielded by the knife edge (220) and to output an electric signal corresponding to energy of received light flux; thus to convert a positional change of the reflected beam into an electric signal.

9. A voice monitoring system using laser beam according to claim 1, wherein the laser transmitter (100) includes:

A CCD camera (121) having a sensitivity for a wavelength of the laser beam (B1), an optical axis of said CCD camera being adjusted so that images of the target (41) and a laser spot (Q) formed on the target can be taken; and a target display unit (113) for displaying said images taken by the CCD camera (121).

10. A voice monitoring system using laser beam according to claim 9, wherein the laser receiver (200) includes:

a CCD camera (216) having a sensitivity for a wavelength of the laser beam (B1);

a target display unit (213) for displaying an image taken by said CCD camera (216);

a positional change detecting unit (218, 220) for converting a positional change of the reflected beam (B2) from the target (410) into an electric signal;

a sound circuit (219) for extracting a voice band component from said electric signal;

an optical device (P1, 217) for selectively forming a first path for guiding the reflected beam (B2) from the target (410) to said CCD camera (216) and a second path for guiding the reflected beam to said positional change detecting unit (218, 220); and an installation state adjustment device (230) for adjusting an installation state of the laser receiver (200).

11. A voice monitoring system using laser beam according to claim 10, wherein the laser receiver (200) includes:

a knife edge (220) provided along an optical path of the reflected beam (B2) from the target (410) for shielding a portion of said reflected beam;

a shielding position adjustment device (221) for adjusting a shielding position of said knife edge (220); and a light receiving element (218) to receive light flux of the reflected beam (B2) which has not been shielded by the knife edge (220) and to output an electric signal corresponding to energy of received light flux; thus to convert a positional change of the reflected beam into an electric signal.

12. A voice monitoring system using laser beam according to claim 9, wherein the laser receiver (200) includes:

a knife edge (220) provided along an optical path of the reflected beam (B2) from the target (410) for shielding a portion of said reflected beam;

a shielding position adjustment device (221) for adjusting a shielding position of said knife edge (220); and a light receiving element (218) to receive light flux of the reflected beam (B2) which has not been shielded by the knife edge (220) and to output an electric signal corresponding to energy of received light flux; thus to convert a positional change of the reflected beam into an electric signal.

13. A voice monitoring system using laser beam for monitoring voice within a room from an outside of the room, the system comprising:

a laser transmitter (100) for irradiating a laser beam (B1) of invisible wavelength band toward a predetermined target (410) to be monitored; and a laser receiver (200) for converting a positional change of a reflected beam (B2) from the target (410) into an electric signal and extracting a voice band component from the electric signal to output it, wherein the laser receiver (200) includes:

a CCD camera (216) having a sensitivity for a wavelength of the laser beam (B1);

a target display unit (213) for displaying an image taken by said CCD camera (216);

a positional change detecting unit (218, 220) for converting a positional change of the reflected beam (B2) from the target (410) into an electric signal;

a sound circuit (219) for extracting a voice band component from said electric signal;

an optical device (P1, 217) for selectively forming a first path for guiding the reflected beam (B2) from the target (410) to said CCD camera (216) and a second path for guiding the reflected beam to said positional change detecting unit (218, 220); and an installation state adjustment device (230) for adjusting a n installation state of the laser receiver (200).

14. A voice monitoring system using laser beam for monitoring voice within a room from an outside of the room, the system comprising:

a laser transmitter (100) for irradiating a laser beam (B1) of invisible wavelength band toward a predetermined target (410) to be monitored; and a laser receiver (200) for converting a positional change of a reflected beam (B2) from the target (410) into an electric signal and extracting a voice band component from the electric signal to output it, wherein the laser receiver (200) includes:

a knife edge (220) provided along an optical path of the reflected beam (B2) from the target (410) for shielding a portion of said reflected beam;

a shielding position adjustment device (221) for adjusting a shielding position of said knife edge (220); and a light receiving element (218) to receive light flux of the reflected beam (B2) which has not been shielded by the knife edge (220) and to output an electric signal corresponding to energy of received light flux; thus to convert a positional change of the reflected beam into an electric signal.

15. A voice monitoring system using laser beam as set forth in claim 14, wherein the laser receiver (200) further includes:

a light receiving sensitivity display unit (M) for displaying a value of an electric signal that the light receiving element (218) outputs; and an installation state adjustment device for adjusting an installation state of the laser receiver (200).

16. A voice monitoring system using laser beam for monitoring voice within a room from an outside of the room, the system comprising:

- a laser transmitter (100) for irradiating a laser beam (B1) of invisible wavelength band toward a predetermined target (410) to be monitored; and
- a laser receiver (200) for converting a positional change of a reflected beam (B2) from the target (410) into an electric signal and extracting a voice band component from the electric signal to output it, wherein the laser transmitter (100) includes:

- a CCD camera (121) having a sensitivity for a wavelength of the laser beam (B1), an optical axis of said CCD camera being adjusted so that images of the target (41) and a laser spot (Q) formed on the target can be taken; and
- a target display unit (113) for displaying said images taken by the CCD camera (121).

* * * * *